United States Patent Office 2,881,886
Patented Apr. 14, 1959

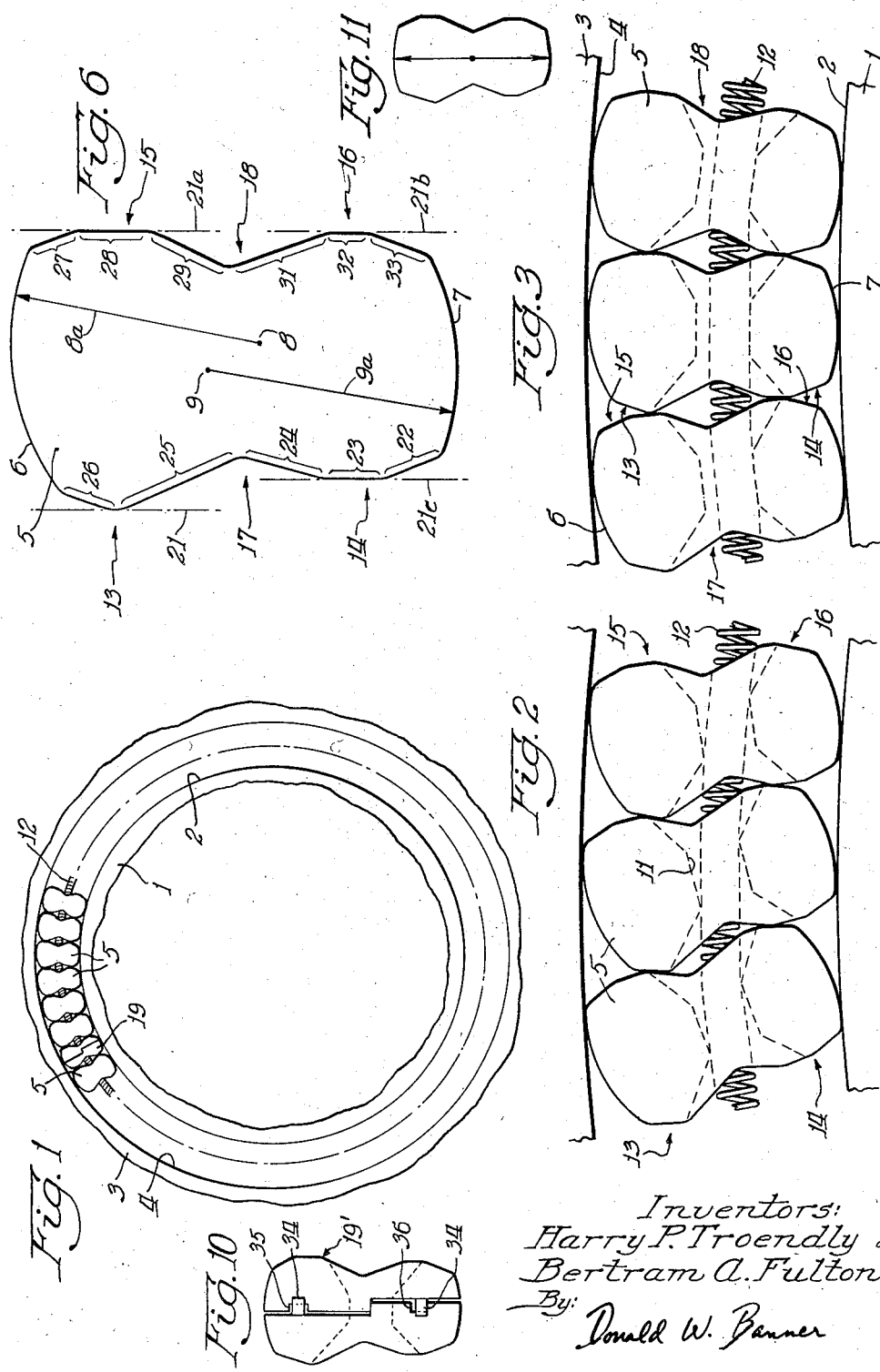

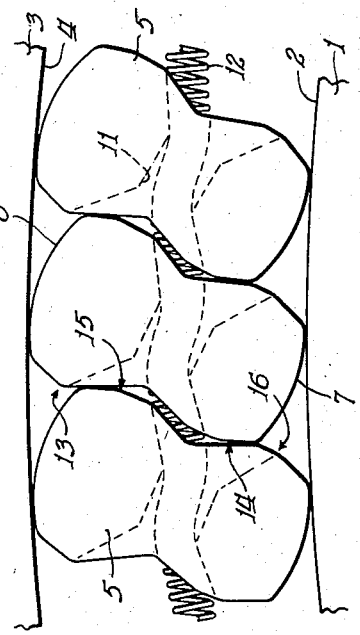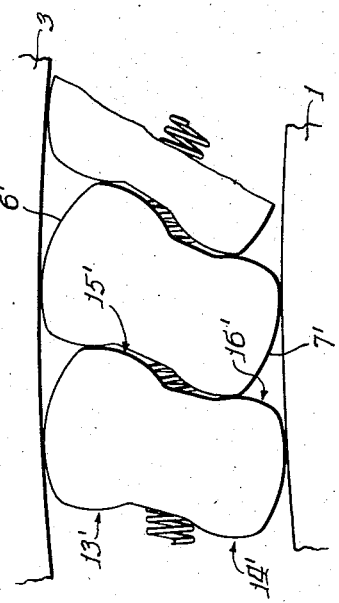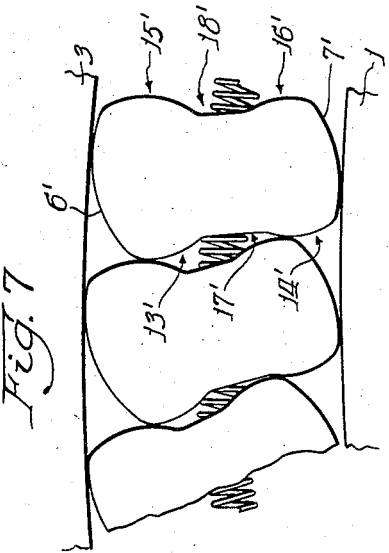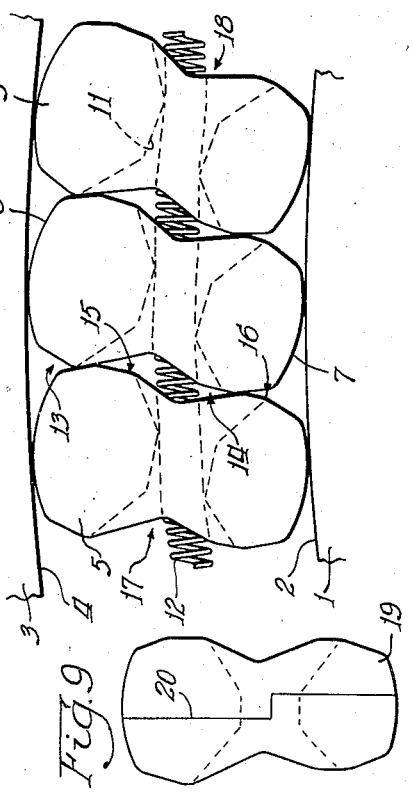
Inventors:
Harry P. Troendly and
Bertram A. Fulton, Jr.
By: Donald W. Banner
Atty.

2,881,886

ONE-WAY CLUTCHES

Harry P. Troendly, La Grange Park, and Bertram A. Fulton, Glen Ellyn, Ill., assignors to Borg-Warner Corporation, Chicago, Ill., a corporation of Illinois Application November 1, 1954, Serial No. 465,974

12 Claims. (Cl. 192—45.1)

This invention relates to one-way engaging devices, and more particularly, to one-way engaging devices of the type employing a full complement of sprags.

One-way engaging devices of the full complement sprag type have previously been known. These devices comprise an outer race having an annular race surface and an inner race having an annular race surface, concentric with the outer race surface, and spaced therefrom so as to provide a generally annular space between the race surfaces. Disposed between the race surfaces in the annular space defined thereby are a plurality of sprags or grippers which comprise rigid members having race engaging surfaces at either end of the sprag curved about spaced centers such that upon tilting of the sprag in one direction the races will be coupled together by virtue of the wedging action of the sprags, and so that when the sprags tilt in the opposite direction one race may turn with respect to the other race. In full complement clutches, the sprags are circumferentially disposed within the annular space defined by the race surfaces so that the annular space is substantially filled with sprags with only working clearance therebetween. Suitable means, such as a garter spring threaded through suitable holes or slots in the sprags, have been provided for biasing the sprags toward wedging engagement with the races.

Such prior art structures have been known for many years, but were never reliable in operations in which high torque loads subject to frequent reversals or vibrations were found. Such prior art structures under the adverse conditions aforementioned would frequently fail completely, one or more of the sprags "rolling over," the different sprags carrying and releasing their respective loads without reference to the task being performed by the other sprags in the clutch. Frequently, in addition, it has been found that the erratic movement of individual sprags in such prior art structures was such that the garter spring employed for energizing the sprags would be broken; in fact, in many commercial applications, it was necessary to employ two garter springs in an effort to make the prior structures last longer.

One further disadvantage of such prior structure is that the circumferential clearance necessary due to the relatively large change in circumferential clearance as the sprags would rotate through their operating range, allowed the sprags to become misaligned axially. Attempts are usually made to correct this situation by providing end plates (generally of hardened steel) which are fitted next to the sprags with a minimum of axial clearance. These plates reduce the skewing in proportion to the axial clearance between sprags and plates and so it becomes necessary to hold the axial dimensions of sprags, plates and other parts of the assembly to close tolerances in an attempt to control skewing.

It is, therefore, one object of the present invention to produce a one-way sprag clutch of the full complement type which will operate satisfactorily under substantially all conditions of operation and which eliminates substantially the defects found in prior art devices of the same general type.

Another object of the present invention is the provision of a structure in accordance with the preceding object in which only a single garter spring or other energizing means is required.

Another object of the present invention is the provision of a one-way sprag type clutch of the full complement type in which each of the sprags employed simultaneously tilts together with each of the other sprags.

Another object of the present invention is a device in accordance with the preceding objects in which each of the sprags simultaneously tilts the same amount as each of the other sprags.

Another object is the provision of a device in accordance with the preceding objects in which each of the sprags is formed with side surfaces near the top and bottom thereof disposed in contact with side surfaces near the top and bottom of the adjacent sprags, the central side surfaces of each of the sprags being recessed, so that a tilting action of one sprag is transmitted by virtue of the aforementioned contacting surfaces to each of the other sprags.

Another object of the present invention is the provision of a full complement, sprag type clutch in accordance with the preceding objects in which all of the sprags are forced by positive means to assume the same angular position relative to the race surface throughout the operating range of the device.

Another object is the provision of a clutch in accordance with the preceding objects in which close, axially fitting, hardened side plates substantially enclosing the annular space occupied by the clutch are obviated.

Other objects and features of the invention will be readily apparent to those skilled in the art from the specification and accompanying drawings illustrating certain preferred embodiments in which:

Figure 1 is a side view, partially in section, of a pair of races between which a one-way clutch embodying the present invention is disposed.

Figure 2 is an enlarged view of a portion of the clutch illustrated in Figure 1, with the sprags being tilted into a locked position;

Figure 3 is a view similar to Figure 2 showing the sprags in a different position;

Figure 4 is a view similar to Figure 3 with the sprags rotated toward a released position;

Figure 5 is a view similar to Figure 4 with the sprags being shown in a fully released position;

Figure 6 is an enlarged view of the sprags illustrated in Figures 2 through 5;

Figure 7 is a partial view illustrating a portion of a clutch embodying the principles of the present invention in which the sprags have been given a configuration differing somewhat from that shown in Figures 1 through 5;

Figure 8 is a view similar to Figure 7 in which the sprags are illustrated in their released position;

Figure 9 is an elevational view of a "filler sprag."

Figure 10 is an elevational view of a modified "filler sprag."

Figure 11 is an elevational view of a modified type of tiltable element.

The clutch shown in Figure 1 is adapted to connect an inner race 1, having a surface 2 to be engaged by the sprags, to an outer race 3 having a surface 4 to be engaged by the sprags. The clutch is adapted so that the races are connected together for rotation in one direction, but permits free relative rotation of the races in the opposite direction. As illustrated in Figure 1, the surfaces 2 and 4 of the races 1 and 3, respectively, are spaced apart so as to define a substantially annular opening therebetween and a series of grippers or sprags 5 are disposed within the aforementioned annular opening circumferentially. Referring now to the sprags illustrated particularly in Figures 1 through 5, each of the sprags is formed to have a race engaging surface at the top and the bottom thereof, these race engaging surfaces being numbered 6 and 7, respectively. The surfaces 6 and 7 are curved about spaced centers 8 and 9, as shown in Figure 6, so that as each gripper or sprag is tilted in one direction, its radial dimension will increase to wedge against the races; while when it is tilted in the opposite direction, its radial dimension will decrease to release the races for free rotation. The sprags are formed with centrally disposed openings therethrough, numbered 11, through which passes a garter spring 12. It should be noted that the openings 11 are flared adjacent to each side of the sprag so that the garter spring 12 is not injured upon tilting of the sprags.

Each of the sprags is provided, as illustrated particularly in Figure 6, with a protruding surface at the upper left side thereof indicated, in general, by the numeral 13, and with another protruding surface at the lower left side thereof indicated in its entirety by the numeral 14. Each of the sprags is also provided with a protruding surface at the upper right portion thereof, generally numbered 15, and with a protruding lower side surface 16 also on the right. Each of the sprags is also provided, along the left side thereof from the view of Figure 6, with a centrally located, indented portion as illustrated, in general, at 17 which is formed by the projections 13 and 14. Each of the sprags is further provided along the central right side thereof, from the view of Figure 6, with a central disposed recess numbered 18 which is formed by the projections 15 and 16.

The projections and indentations 13 through 18 on each of the sprags are such that the surfaces 13 and 14 of each sprag are in contact at all times throughout the operating range of the clutch with the surfaces 15 and 16, respectively, of the immediately adjacent sprag to the left (from the view of Figures 2 through 5). Furthermore, each surface 15 and 16 of each sprag is constantly in contact with the surfaces 13 and 14, respectively, of the sprag immediately adjacent to the right thereof (from the view of Figures 2 through 5) throughout the operating range of the clutch. The indentations 17 and 18 in each sprag, furthermore, are such that the tilting of the sprags is permitted without disturbing this contact between the side surfaces 13, 15 and 14, 16 aforementioned.

Considering now the operation of the device of the present invention as illustrated in Figures 1 through 5 hereof, in Figure 5 there is shown sprags having the configuration aforementioned in their released position. The garter spring 12 in such circumstances tends to rotate the sprags from the condition illustrated in Figure 5 in a counterclockwise direction. It will, therefore, be seen that when the outer race 3 starts to move counterclockwise relative to the inner race 1, the sprags 5 will rotate, initially from the position of Figure 5 to that shown in Figure 4, and subsequently to the positions illustrated in Figures 3 and 2. It should be noticed that as the sprags move from the position illustrated in Figure 5 to the position illustrated in Figure 2, the radial dimension of the sprags 5 increases until, in Figure 2 position, the races 1 and 3 are wedgingly connected together for rotation in unison at nearly maximum torque.

When the race 3 turns in a clockwise direction relative to the race 1, the sprags will be moved by virtue of such relative rotation of the races from the position illustrated in Figure 2 through the positions illustrated in Figures 3 and 4 to the position illustrated in Figure 5 in which the races are completely disengaged, inasmuch as the radial dimension of the sprags has decreased.

It is very important to notice, as illustrated in Figures 2 through 5, that as any one sprag begins to tilt or move angularly when going from the released position of Figure 5 to the "locked-up" position of Figure 2, the surfaces 13 and 14 of that sprag engage the surfaces 15 and 16 of the sprag immediately to the left thereof and force it also to move angularly the same amount and in the same direction. This motion, of course, is transmitted throughout the ring of sprags so that each of the sprags moves together angularly with each and every other sprag throughout the operating range of the clutch.

Similarly, in going from the "locked-up" position to the released position, the surfaces 15 and 16 of each sprag engage and apply a force to the surfaces 13 and 14 of the sprag immediately to the right thereof so that tilting movement of one sprag is transmitted to the adjacent sprag throughout the entire ring of sprags. As a consequence, each of the sprags is positively forced to move the same angular amount as each and every other sprag, and in the same direction, throughout the operating range of the clutch.

Attention is now directed to Figures 7 and 8 in which a modified form of sprag $5^1$ is illustrated which is adapted to connect together inner and outer races 1 and 3. Each of these sprags is provided with race engaging surfaces $6^1$ and $7^1$ curved about spaced centers so that as the sprag tilts its effective radial dimension changes. Along the left side, from the view of Figures 7 and 8, of each of the sprags there is provided an upper portion $13^1$ and a lower portion $14^1$ which project outwardly as indicated, a central portion $17^1$ along the left hand side of each of the sprags being recessed. The right side of each sprag, from the view of Figures 7 and 8, is provided with an upper projecting portion $15^1$ and a lower projecting portion $16^1$ between which is formed a recessed portion $18^1$ as illustrated. It will be seen that the sprags are formed somewhat differently than those illustrated in Figures 2 through 5, but retain the general characteristics of projecting portions at the top and bottom of each side of the sprags which are disposed in contact with the comparable projecting portions on each of the adjacent sprags. By this arrangement, each sprag is forced by positive means to move the same angular amount as each and every other sprag in the clutch. The portions $13^1$, $14^1$, $15^1$ and $16^1$ are, as indicated in Figures 7 and 8, substantially cylindrical, and the ratio of the radii forming such portions is proportionate to ratio of the distances between the center of rotation of the races and the centers of curvature of the portion. In this manner, the sprags each engage the adjacent sprags regardless of the angular disposition of the sprags between the races. The operation of the clutch illustrated in Figures 7 and 8 is substantially the same as that previously described with respect to Figures 2 through 5; in Figure 7 there is shown the "locked-up" position of the sprags in which the races 1 and 3 are wedgingly connected together. Figure 8 illustrates the released position of the sprag in which the races 1 and 3 are not connected together, as will be readily understood by those skilled in the art. As is the case with the clutch illustrated particularly in Figures 2 through 5, the central portion of each of the sides of the sprags is recessed so that the full tilting movement of the sprags may be accomplished.

It will be seen that the device of the present invention provides positive means for effecting simultaneous angular movement of each of the sprags employed so that each will bear its proportionate share of the load throughout the operating range of the structure. It will further be seen that because of that fact no one sprag, or small number of sprags, need carry an unusually large load—as was the condition with prior art devices. It will further be seen that only a single energizing spring need be employed; in addition, the sprags will not, due to unusual loading conditions, roll over individually or twist as was frequently the case with prior constructions. The device of the present invention will further have long life because each of the sprags will move together with each and every other sprag so that the load will be proportionately assumed by each of these sprags. It will further be seen that because the circumferential clearance between the sprags is at a minimum at any angular position of the sprags, the sprags are unable to skew axially and so close fitting side plates are unnecessary.

No mention has been made herein of the manner in which the device of the present invention is assembled inasmuch as this method of assembly will be obvious to those skilled in the art. Furthermore, no mention has been made of the fact that retaining means are necessary to prevent large axial movement of the clutch inasmuch as this, too, is obvious. Preferably, the device of the present invention is employed in a lubricating atmosphere, the races being held concentric by suitable means. In addition, the surfaces on each of the sprags are rounded smooth by tumbling or similar process to reduce inter sprag friction.

It has also been found, under some (but not all) circumstances and conditions, that a full complement of sprags of uniform dimensions cannot be inserted into the annular spaces formed by the races. In such cases, a filler sprag 19, of the type shown in Figure 9, may be employed. Such a sprag has substantially the same outside contour as the sprags discussed earlier herein, but the circumferential dimension of the sprag is different. Such a structure is shown in Figure 9 wherein it may be seen that the sprag is split along a radial line, the desired amount of material having been removed so that its circumferential dimension is proper to permit the accommodation of a full complement of sprags within the space formed by the races. Such a filler sprag is preferably made in two pieces of the proper dimension and outside contour and having complementary surfaces forming a "stepped" engaging area 20 therebetween. It should be noticed, however, that the sprag 19 has radially spaced end surfaces which may be curved about spaced centers so that the filler sprag acts under the proper circumstances to wedgingly engage the races or such surfaces may be curved about a common center so that the filler sprag (although not actually a sprag under such conditions) does not wedgingly engage the races; the filler sprag illustrated in Figure 9, however, has contours along its circumferentially facing sides such that the engagement between it and the sprags at either side thereof is constant so that the filler sprag will tilt and will transmit tilting forces the same as any other sprag.

In certain cases, particularly where skewing of the sprags must be held to an absolute minimum, a filler sprag 19¹ may be employed. As shown in Figure 10 sprag 19¹ is provided with a pair of generally U-shaped springs 34 respectively inserted between the two halves of the filler sprag, in suitable slots 35 and 36, to take up any minute residual clearances between the sprags which might arise due to inaccuracies of manufacture. It should be clearly understood, however, that the present invention does not require the use of any type of "filler sprags," and such elements are in no way essential to the practice of the invention inasmuch as the entire annular space between the races may be circumferentially filled with sprags 5 or comparable sprags.

As a specific example of the construction of one type of sprag suitable for accomplishing the objects of this invention when the races have a particular dimension, reference is made to the sprag illustrated in Figure 6. With the races of the particular suitable dimension, such a sprag may have an overall radial dimension of 0.3765–0.3775 inch. With the dotted lines 21, 21a, 21b, and 21c in Figure 6 all parallel, the center 8 may be disposed 0.096–0.098 inch inwardly from line 21a, and the radius 8a defining the race engaging surface 6 may be of the order of 0.209–0.212 inch. The center 9 may be spaced 0.117–0.121 inch inwardly (to the left in Figure 6) from the line 21a while the radius 9a employed to define the race engaging surface 7 may be of the order of 0.209–

0.212 inch. The surface 22 may be disposed at an angle of 21 degrees from the line 21c while the surface 23 is parallel to the line 21c and has a length of the order of 0.049 inch plus or minus 4 thousands of an inch. The surface 24 may be at an angle of 15 degrees to the line 21c, while the surface 25 may be at an angle of 24½ degrees to the line 21. The surface 26 may be at an angle of 18 degrees to the line 21 with the juncture between the surfaces 25 and 26 being disposed 0.087–0.091 inch from the highest point of the race engaging surface 6. The surface 27 may be at an angle of 19 degrees with respect to the line 21a while the surface 28 is parallel to the line 21a, the juncture between the surfaces 27 and 28 being 0.060–0.057 inch below the highest point of the race engaging surface 6. The surface 28 has a length of 0.084–0.061 inch. The surface 29 may be disposed at an angle of 26 degrees to the line 21a while the surface 31 may be disposed at an angle of 18 degrees to the line 21b. The surface 32 is parallel to line 21b and may have a length of 0.027 inch plus or minus 4 thousands of an inch. The surface 33 may be disposed at an angle of 20 degrees to the line 21b. The juncture between the surfaces 24 and 25 may be disposed 0.034–0.050 inch inwardly from the line 21 (which passes through the juncture between lines 25 and 26) while the juncture between the lines 21 and 31 may be disposed 0.030 inch inwardly of the line 21a (which passes through the surface 22). The overall dimension between the lines 21 and 21a may be of the order of 0.2355–0.2365 inch, while the overall dimension between the lines 21b and 21c (which, respectively, lie in the plane of surfaces 32 and 23) may be of the order of 0.2095–0.2105 inch. All of the angles mentioned may be plus or minus one degree while all fillet radii are preferably of the order of 0.015–0.018 inch. It will be readily apparent to those skilled in the art that sprags having other configurations may also accomplish the objects of this invention and the foregoing dimensions are merely illustrative of one type of sprag useful for that purpose when the race dimensions are of a particular nature. It will also be obvious that, if desired, certain of the tiltable elements employed (other than the "filler" sprags previously discussed) may have radially spaced end surfaces for engaging the races which are curved about a common center—within the tiltable element—so that such modified tiltable elements do not wedgingly engage the races, but rather act as bearing elements during overrunning of the races. Such modified tiltable elements are identical with the other tiltable elements employed in the construction of the circumferentially facing sides, those sides having contours such that the engagement between these modified tiltable elements and the tiltable elements at either side thereof is constant so that the modified tilting element will tilt and will transmit tilting forces the same as any other tiltable element. Such a modified element is illustrated in Figure 11.

While certain preferred embodiments of the invention have specifically disclosed, it is understood that the invention is not limited thereto, as many variations will be apparent to those skilled in the art and the invention is to be given its broadest possible interpretation within the terms of the following claims.

What is claimed is:

1. A one-way engaging device adapted to connect inner and outer races during relative rotation thereof in one direction and to permit relative rotation thereof in the opposite direction comprising a plurality of tiltable elements spaced circumferentially between the races, means on at least certain of said tiltable elements defining race engaging surfaces at the ends thereof adapted to effect wedging engagement of the tiltable elements with the races when the races rotate in the one direction only, a pair of radially spaced means on the sides of adjacent sprags tiltable elements disposed in engagement simultaneously adapted and arranged to force each tiltable element to tilt the same amount as all other tiltable elements and simultaneously with the other tiltable elements throughout the working range of the device, and means biasing said certain tiltable elements toward engagement with the races.

2. A one-way engaging device adapted to connect inner and outer races during relative rotation thereof in one direction and to permit relative rotation thereof in the opposite direction comprising a plurality of sprags spaced circumferentially between the races, means on each of said sprags defining race engaging surfaces at the ends thereof adapted to effect wedging engagement of the sprags with the races when the races rotate in the one direction only, means defining a pair of protuberances projecting from each circumferentially facing side of each sprag adapted to engage the protuberances on the adjacent sprags and effect common sprag tilting movement, one of each pair of protuberances being above the radial midpoint of the sprag and the other being below said midpoint, and means biasing said sprags toward engagement with the races.

3. A one-way engaging device adapted to connect inner and outer races during relative rotation thereof in one direction and to permit relative rotation thereof in the opposite direction comprising a plurality of sprags spaced circumferentially between the races, means on each of said sprags defining race engaging surfaces at the ends thereof adapted to effect wedging engagement of the sprags with the races when the races rotate in the one direction only, means on each circumferentially facing side of each of said sprags defining an upper projection above the sprag radial midpoint and a lower projection below the sprag radial midpoint, means on each of said sprags defining a recessed portion intermediate said projections, said sprags being disposed between said races with the projections on each sprag continuously in contact with the projections of the sprags at either side thereof throughout the working range of the device, and means biasing said sprags toward engagement with the races.

4. The device defined in claim 3 in which said sprags and projections are of rigid material, said projections being adapted and arranged to force positively each sprag to tilt substantially the same amount as all the other sprags and substantially simultaneously with the other sprags throughout the working range of the device.

5. The device defined in claim 4 in which means are provided defining openings through said sprags extending between said recessed portions, and in which said means biasing said sprags comprises spring means extending through said openings.

6. In a one-way engaging device, the combination comprising a pair of races providing spaced annular surfaces defining a generally annular opening therebetween, a plurality of sprags circumferentially disposed within said annular opening constructed and arranged to substantially fill the annular opening with only working clearance between the sprags, means on each of said sprags defining race engaging surfaces at opposite ends thereof curved about spaced centers whereby said sprags connect said races during relative rotation thereof in one direction and permit relative rotation thereof in the opposite direction, means defining a pair of projections respectively above and below the sprag radial midpoint on each circumferentially facing side of each sprag constructed and arranged to force substantially equal simultaneous tilting of all of said sprags throughout the working range of said device, and means biasing said sprags toward engagement with said races.

7. The device defined in claim 6 in which means defining slots through said sprags are provided, and in which said means biasing said sprags comprise spring means extending through said slots.

8. In a one-way engaging device, the combination comprising a pair of coaxial races including means thereof defining spaced annular surfaces which define a generally annular opening therebetween, a plurality of sprags circumferentially disposed within said annular opening, means on each of said sprags defining race engaging surfaces at radially opposite sides thereof respectively curved about spaced centers whereby said sprags connect said races during relative rotation thereof in one direction and permit relative rotation thereof in the opposite direction, means defining substantially flat axially facing sides on said sprags, means defining a pair of projections respectively above and below the sprag radial midpoint on each circumferentially facing side of each sprag constructed and arranged to force all of said sprags to tilt in unison, said sprags being disposed in said annular opening with said last-mentioned means in engagement whereby said sprags substantially fill said annular opening with only working clearance between the sprags, and means biasing said sprags toward engagement with said races.

9. The device defined in claim 8 in which slots are provided in said sprags, and in which said means biasing said sprags comprise spring means extending through said slots.

10. In a one-way engaging device of the full complement type adapted to connect wedgingly a pair of relatively rotatable races upon rotation thereof in one direction and to permit relative rotation thereof in the opposite direction, the combination comprising a plurality of tiltable elements disposed between the races in circumferential alignment and engagement, means on each of said tiltable elements defining a plurality of radially spaced projections on the circumferentially facing surfaces thereof simultaneously disposed in engagement with the projections on the adjacent tiltable elements constructed and arranged to effect substantially common tilting movement of said tiltable elements throughout the working range of the device, at least one of said tiltable elements comprising a pair of parts having means defining complementary engaging surfaces therebetween constructed and arranged to form a stepped engaging area between said pair of parts, at least some of said tiltable elements being constructed and arranged to wedgingly engage the races upon relative rotation thereof in said one direction, and means biasing said last mentioned tiltable elements toward wedging engagement with the races.

11. In a one-way engaging device adapted to wedgingly engage a pair of races which are rotatable about a common center upon relative rotation of the races in one direction and to permit relative rotation of the races in the opposite direction, the combination comprising a plurality of tiltable means adapted to be disposed between the races in circumferential alignment, circumferentially extending means on said tiltable means comprising an upper and a lower curved projection radially spaced from each other by a depression on each circumferentially facing side of said tiltable means disposed in engagement simultaneously with adjacent tiltable means and adapted to effect substantially common tilting movement of said tiltable means throughout the working range of the device, at least some of said tiltable means being constructed and arranged to wedgingly engage the races upon relative rotation thereof in said one direction and to permit relative rotation thereof upon rotation in said opposite direction, and means biasing said last-mentioned tiltable means toward wedging engagement with the races.

12. In a one-way engaging device adapted to wedgingly engage a pair of races which are rotatable about a common center upon relative rotation of the races in one direction and to permit relative rotation of the races in the opposite direction, the combination comprising a plurality of tiltable means adapted to be disposed between the races in circumferential alignment, circumferentially extending means on said tiltable means comprising an upper and a lower curved projection radially spaced from each other by a depression on each circumferentially facing side of said tiltable means disposed in engagement simultaneously with adjacent tiltable means and adapted to effect substantially common tilting movement of said tiltable means throughout the working range of the device, at least some of said tiltable means being constructed and arranged to wedgingly engage the races upon relative rotation thereof in said one direction and to permit relative rotation thereof upon rotation in said opposite direction, means biasing said last-mentioned tiltable means toward wedging engagement with the races, and the ratio of the radii forming said upper and lower projections being proportionate to the ratio of the distances between the center of rotation of the races and the centers of curvature of said portions.

References Cited in the file of this patent

UNITED STATES PATENTS

| | | |
|---|---|---|
| 1,542,040 | De Lavaud | June 16, 1925 |
| 2,154,212 | Moorhouse | Apr. 11, 1939 |
| 2,240,359 | Weigel | Apr. 29, 1941 |
| 2,388,424 | Lund | Nov. 6, 1945 |
| 2,631,706 | Dodge | Mar. 26, 1949 |
| 2,683,510 | Troendly | July 13, 1954 |

FOREIGN PATENTS

| | | |
|---|---|---|
| 756,885 | France | Oct. 2, 1933 |

UNITED STATES PATENT OFFICE
CERTIFICATE OF CORRECTION

Patent No. 2,881,886                      April 14, 1959

Harry P. Troendly et al.

It is hereby certified that error appears in the printed specification of the above numbered patent requiring correction and that the said Letters Patent should read as corrected below.

Column 6, line 71, after the word "adjacent" strike out "sprags".

Signed and sealed this 4th day of August 1959.

(SEAL)
Attest:

KARL H. AXLINE
Attesting Officer

ROBERT C. WATSON
Commissioner of Patents